(12) United States Patent
Gila et al.

(10) Patent No.: US 7,848,826 B2
(45) Date of Patent: Dec. 7, 2010

(54) METHOD FOR ENABLING THE OPERATION OF AUTOMATION COMPONENTS OF A TECHNICAL SYSTEM VIA A MOBILE CONTROL AND MONITORING DEVICE

(75) Inventors: Janos Gila, Mödling (AT); Wolfgang Konrad, Mödling (AT); Gottfried Rieger, Fürth (DE); Ulrich Sinn, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 208 days.

(21) Appl. No.: 11/899,547

(22) Filed: Sep. 6, 2007

(65) Prior Publication Data

US 2008/0077255 A1 Mar. 27, 2008

(30) Foreign Application Priority Data

Sep. 22, 2006 (EP) .................................. 06019937

(51) Int. Cl.
*G05B 11/01* (2006.01)
*G05B 19/18* (2006.01)
*G05B 15/00* (2006.01)
*G05B 23/02* (2006.01)
*G08B 3/00* (2006.01)

(52) U.S. Cl. .......................... 700/13; 340/3.71; 340/3.9; 340/328; 700/17; 700/65; 700/66; 700/83

(58) Field of Classification Search ................... 700/13, 700/64, 65, 66, 83, 17; 340/3.71, 3.9
See application file for complete search history.

(56) References Cited

U.S. PATENT DOCUMENTS 6,084,512 A * 7/2000 Elberty et al. ............ 340/572.1

(Continued)

FOREIGN PATENT DOCUMENTS

DE 10110776 A1 9/2001

(Continued)

OTHER PUBLICATIONS

Machine Translation of EP1672445 including : (1) specification; (2) Claims (3) abstract. (Jun. 21, 2006).*

*Primary Examiner*—Ramesh B Patel
*Assistant Examiner*—Sivalingam Sivanesan

(57) ABSTRACT

There is described a method for enabling the operation of automation components of a technical system via a mobile control and monitoring device. In a first step, the control and monitoring device receives a first identification from a first transponder device, with the first transponder device being attached to the technical system, with the first transponder device having been activated by the automation components and with the first identification having been transmitted via a wireless communication connection from the automation components to the mobile control and monitoring device. In a further step the communication connection between the control and monitoring device and the automation components is deactivated. The mobile control and monitoring device sends a carrier signal and following that receives the carrier signal modulated by the first transponder device. A first distance between the control and monitoring device and the first transponder device is then determined from the modulated carrier signal. In addition, a first radio-determined identification from the first transponder device is determined from the modulated carrier signal. Following the reception of the modulated carrier signal, the communication connection is reactivated. If the first distance is shorter than a predetermined first distance and if the radio-determined first identification corresponds to the first identification, the operation of the automation components is enabled.

20 Claims, 4 Drawing Sheets

U.S. PATENT DOCUMENTS

| | | | | |
|---|---|---|---|---|
| 6,167,464 | A | * | 12/2000 | Kretschmann ................ 710/15 |
| 6,314,297 | B1 | * | 11/2001 | Karl ........................ 455/456.3 |
| 6,717,382 | B2 | * | 4/2004 | Graiger et al. ............... 318/587 |
| 7,444,188 | B2 | * | 10/2008 | De Meyer et al. ............. 700/17 |
| 2005/0015180 | A1 | * | 1/2005 | Steger ........................ 700/230 |
| 2007/0058580 | A1 | * | 3/2007 | Chae .......................... 370/328 |

FOREIGN PATENT DOCUMENTS

| | | |
|---|---|---|
| DE | 10129189 A1 | 1/2003 |
| DE | 103 43 251 A1 | 5/2005 |
| EP | 1429217 A2 | 6/2004 |
| EP | 1 672 380 A1 | 6/2006 |
| EP | 1672445 A1 | 6/2006 |

* cited by examiner

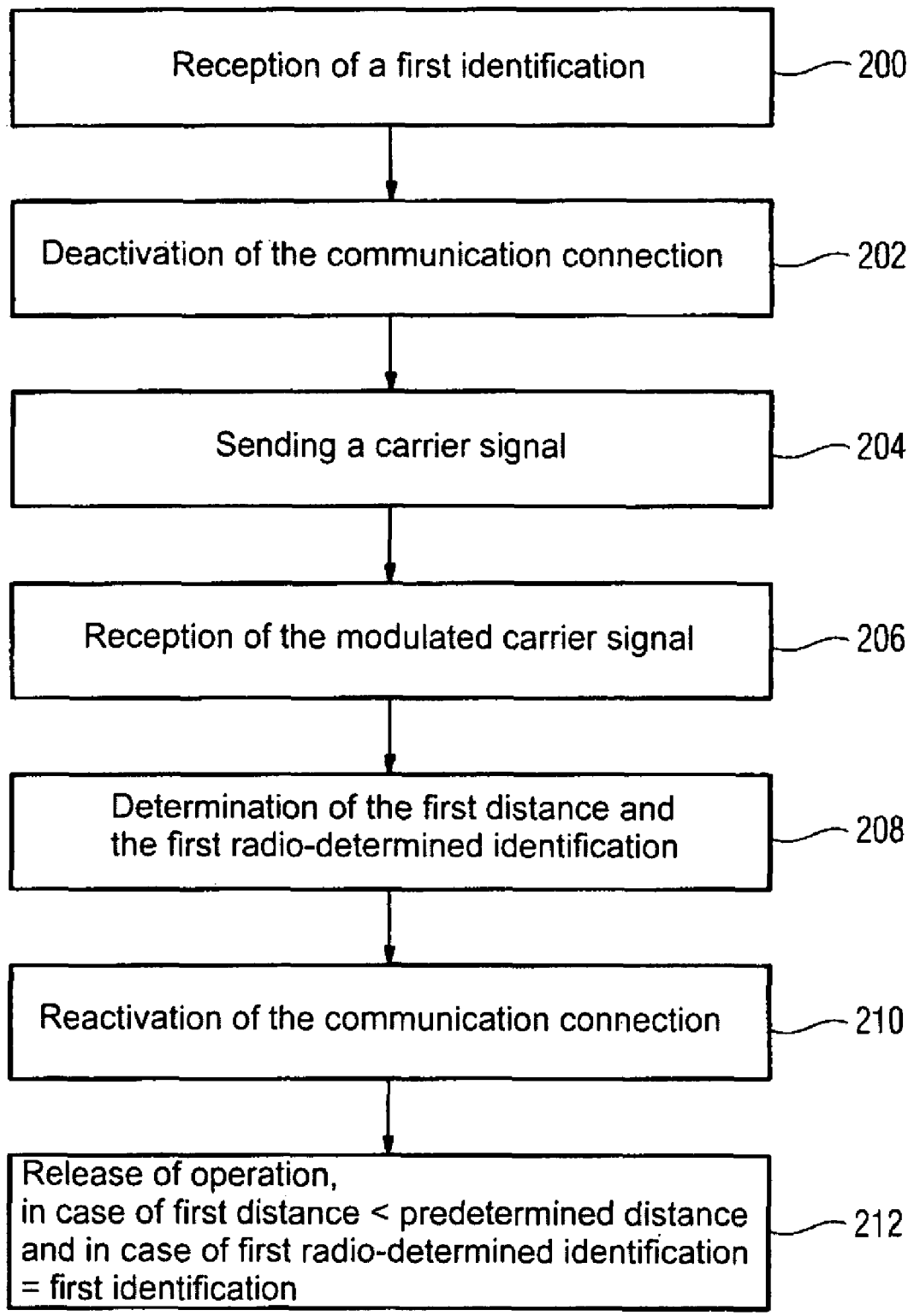

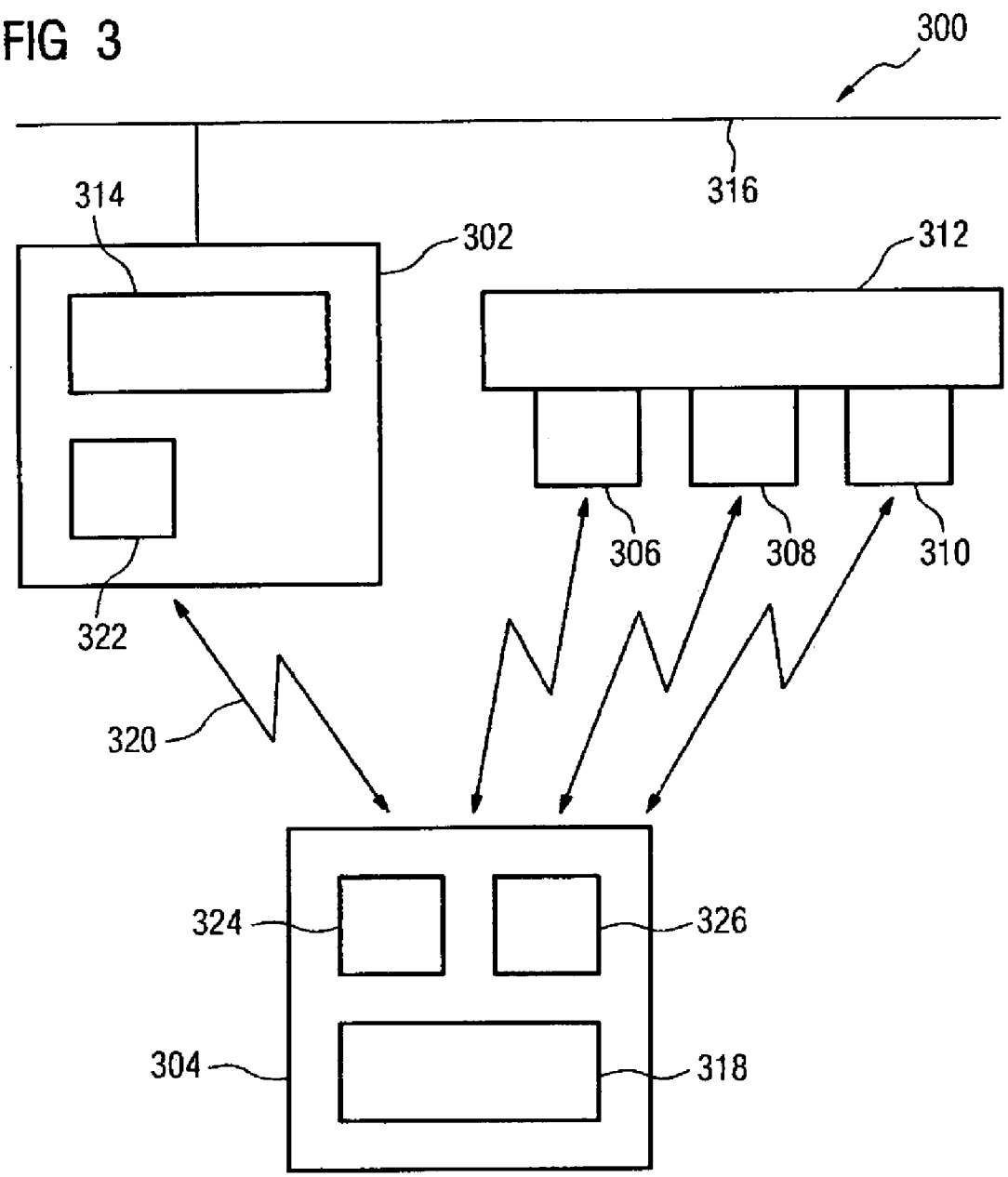
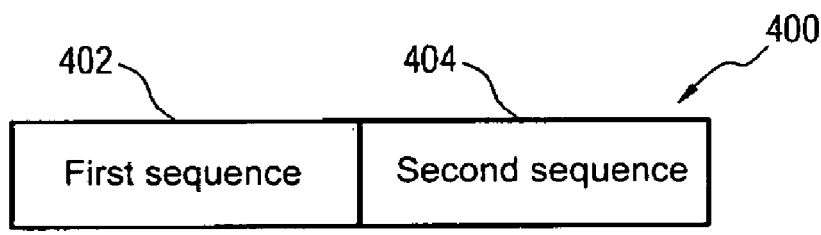

METHOD FOR ENABLING THE OPERATION OF AUTOMATION COMPONENTS OF A TECHNICAL SYSTEM VIA A MOBILE CONTROL AND MONITORING DEVICE

CROSS REFERENCE TO RELATED APPLICATIONS

This application claims priority of European application No. 06019937.9 EP filed Sep. 22, 2006, which is incorporated by reference herein in its entirety.

FIELD OF INVENTION

The invention relates to a method for enabling the operation of automation components of a technical system by means of a mobile control and monitoring device, a control and monitoring device, automation components and a computer program product for carrying out the method in accordance with the invention.

BACKGROUND OF INVENTION

Technical systems are all types of technical devices and systems both arranged individually and within a data processing network, for example, via a field bus. In the case of industrial applications these include individual operating resources, for example, drives and processing machines. However, a technical system can also be a production unit in which an overall technical process is operated using locally distributed operating means, for example a chemical unit or a production line. Technical systems are controlled and operated using specific digital data processing systems, also referred to as automation components. In such a system on the one hand there are components used for direct control of the technical system, i.e. Programmable Logic Controllers PLC. In order to reduce the load on these controllers, automation systems have further specific devices, which form an interface for operating personnel. These are referred to as control and monitoring devices, in short B+B, as BETE devices or also as HMI devices (Human Machine Interface devices).

The term HMI device is a generic term covering all components associated with this group of devices. One example is operator panels or in short OPs. These can be stationary or mobile. HMI devices are used in networked automation as aids for operating personnel so that they can display and control process data of the technical system to be controlled. This function is referred to as Supervisor Control and Data Acquisition (SCADA). To this end, the HMI device generally has specific hardware. In other words it has a touch screen for example and is specifically shielded from environmental influences. Specific software is also executed therein. This provides functions which enhance user-friendliness, quality and safety of operation by an operator. Thus HMI devices can be used to visualize, control, configure and generate interactive process maps of the technical system to be operated. On the one hand this allows the selective display of responses of the technical system, generally in the form of measured values and messages. On the other hand the customized predefinition of control operations and data inputs allows the technical system to be switched to required states.

HMI devices are frequently permanently integrated, for example in the form of terminals, as stationary components in an automation system. Such terminals are then generally connected permanently to the automation system via cable connections. If these terminals are in the form of handheld devices, their radius of action is limited by a connecting cable. In many instances this ensures that an operator can only carry out safety-relevant operations in direct proximity to the technical system or at least when there is adequate visual contact.

However the situation is different when an HMI device is in the form of a mobile control and monitoring device. Such a mobile control and monitoring device can for example be connected to the automation system or the automation components via a radio link over a long range. In such an instance the possibility of an operator using a mobile control and monitoring device moving so far from an associated technical system that safety-relevant operations are carried out from a distance that is not permitted per se. In such an instance personnel safety would not be guaranteed.

In order to avoid control of the automation system by the control and monitoring device from a distance that is not permitted, it is advantageous to localize the control and monitoring device and depending on its position to enable or disable safety-relevant operations of the technical system. To this end the HMI system can also be provided with evaluation means for managing an active operating area around the technical system. The localization means evaluate the distance between the mobile control and monitoring device and the technical system in order to be able to detect whether the mobile control and monitoring device is located inside the active operating area.

The distance can be measured in this case for example with the aid of the contactless data transmission link, which connects the automation components and the mobile control and monitoring device together for data purposes.

In order to localize the distance determination, the mobile control and monitoring device can be equipped with sending and receiving means, which transmit an interrogation signal and from a resulting radio response signal received, the distance or the absolute position of the mobile control and monitoring device can be determined.

Interrogation and radio response signals are typically radar signals. The radio response signal can for example arise from a reflection of the interrogation signal from a reflecting object. Reflecting objects are for example transponder devices, which generate and transmit a modulated radio response signal as response to a received interrogation signal. Such a transponder device can for example be attached to the technical system, with the distance between a mobile control and monitoring device and the technical system being able to be determined with the aid of received radio response signals.

DE 103 43 251 describes an HMI system with a manual device for enabling or disabling safety-relevant operations of the technical system and means for localizing the mobile control and monitoring device. Evaluation means in the control and monitoring device activate the automation components for safety-relevant operations of the technical system via the control and monitoring device only when the manual device is enabled and the locating means detect that the mobile control and monitoring device is localized inside the active operating area.

EP 1 672 380 describes an HMI system with integrated transmitter and receiver concept. The control and monitoring system comprises transmitting and receiving means to localize the mobile control and monitoring device. The localization action allows an active operating area to be managed with the aid of evaluation means. The evaluation means activate the automation components for safety-relevant operations when the control and monitoring device is located inside the active area. The transmitting and receiving means are developed for the simultaneous transmission and reception of radio signals and are integrated into a single antenna module for the transponder device or the mobile control and monitoring device in each case.

SUMMARY OF INVENTION

An object underlying the invention is to provide an enhanced method for enabling the operation of automation components of a technical system via a mobile control and monitoring device compared with the prior art. In addition the object underlying the invention is to provide an enhanced mobile control and monitoring device, enhanced automation components, as well as an enhanced HMI system.

The objects underlying the invention are achieved by means of the features of the independent claims in each case. Embodiments of the invention are specified in the dependent claims.

In accordance with the invention, a method is created for enabling the operation of automation components of a technical system via a mobile control and monitoring device. In a first step, the control and monitoring device receives a first identification from a first transponder device, with the first transponder device being attached to the technical system, with the first transponder device having been activated by the automation components and with the first identification having been transmitted via a wireless communication connection from the automation components to the mobile control and monitoring device. In a further step the communication connection between the control and monitoring device and the automation components is deactivated. The mobile control and monitoring device sends a carrier signal and thereafter receives the carrier signal modulated by the first transponder device. A first distance between the control and monitoring device and the first transponder device is then determined from the modulated carrier signal. In addition, a first radio-determined identification from the first transponder device is determined from the modulated carrier signal. Following the reception of the modulated carrier signal, the communication connection between the control and monitoring device and the automation components is reactivated. If the first distance is shorter than a predetermined first distance and if the radio-determined first identification corresponds to the first identification, the operation of the automation components is enabled. Otherwise the operation of the automation components via the mobile control and monitoring module is disabled.

The technical system can be fitted with a plurality of transponder devices that can be activated or deactivated via the automation components. The control and monitoring device receives a first identification that is assigned to a first transponder device, which has previously been selected by the automation components. After the transmission of this first identification to the mobile control and monitoring device, the first transponder device is activated by the automation components, with the other transponder devices remaining deactivated. If the control and monitoring device now sends the carrier signal, only the first transponder device responds because only this device has been activated. The further transponder devices do not modulate the carrier signal because these devices are not activated. Activation of the transponder device by the automation components has the advantage that a transponder device can be chosen selectively from a plurality of transponder devices which are attached to the technical system, the control and monitoring device then determining its distance from said transponder device. In this process, the other transponder devices do not interfere with the determination of the distance.

It is further ensured by the control and monitoring device, by reading out the radio-determined identification which is specified in coded form on the transponder device, and by comparing this radio-determined identification to the identification assigned to the transponder device which has previously been transmitted from the automation components to the mobile control and monitoring device, that a transponder of another technical system, which is located at a suitable distance to the technical system and in which a transponder is active, has not been detected by accident.

In addition, it is advantageous for the communication connection between the control and monitoring device and the automation components to be deactivated during the transmission of the carrier signal and the reception of the carrier signal modulated by the first transponder device. The communication connection for example is a WLAN connection (IEEE 802.11) with frequencies in the 2.4 GHz or 5.7 GHz range or a Bluetooth connection (IEEE 802.15.1) with frequencies in the range between 2.402 and 2.480 GHz. The carrier signal as an interrogation signal or the modulated carrier signal as a radio response signal of the first transponder device are typically radar signals, which lie in the same frequency range. The deactivation of the communication connection thus has the advantage that the communication connection does not interfere with the determination of the distance or with the determination of the radio-determined identification by means of the modulated carrier signal.

In accordance with one embodiment of the invention, the method according to the invention in addition comprises the step of the transmission of a first message to the automation components after the control and monitoring device has been activated by the user, with the user requesting, by means of the first message, information about the operation of the automation components. In a further step, the automation components confirm receipt of the acknowledgement message, with the first identification being transmitted in the first acknowledgement message or in a further message following the acknowledgement message. The control and monitoring device in addition sends a second message to the automation components to acknowledge receipt of the acknowledgement message, with the first transponder device being activated after the second message has been received by the automation components. In addition, after the reception of the second message, the automation components are only assigned to the control and monitoring device, i.e. other control and monitoring devices cannot communicate with the automation components or cannot operate the automation components in the period in which the automation components are assigned to the control and monitoring device. Assigning the automation components to the control and monitoring device has the advantage that only a single control and monitoring device in each case communicates with the automation components via a communication connection. This has the advantage that no further communication of another control and monitoring device takes place and in this way cannot interfere with the determination of the distance or the first radio-determined identification of the transponder device.

In accordance with one embodiment of the invention, the first distance and the first radio-determined identification are determined at regular or irregular time intervals, with the communication connection between the control and monitoring device and the automation components being deactivated while the distance is being measured. This has the advantage that the first distance value and the first identification are already known when the user wants to carry out a safety-relevant operation on the automation components via the control and monitoring device.

In addition, the distances determined can be stored on the control and monitoring device. Should a distance measurement that has just been carried out fail, then the first distance that has last been determined can for example be used in order to compare it to the predetermined first distance and if required to enable the operation of the automation components for the user.

In accordance with one embodiment of the invention, the carrier signal comprises a first sequence and a second sequence, with the first sequence being used to determine the distance and with the second distance being used to determine the first radio-determined identification. In this process, the first sequence is embodied so that with said sequence the first distance to the transponder device can be determined by means of the well known frequency modulated continuous wave (FMCW) method according to the prior art. In this process, the FMCW method corresponds to a frequency-modulated continuous-dash radar method, with radar beams being emitted continuously and with the frequency of the radar beams being subjected to a periodic modulation. Because the transmit frequency of the carrier signal continuously changes in the first sequence, the emitted radar signal and the radar signal reflecting from the object shows a frequency shift, which corresponds to a runtime difference. This runtime difference corresponds to twice the distance between the control and monitoring device and the reflecting object. In order to determine a distance, the received signals of the first sequence typically have to undergo a spectral analysis. If a power spectrum is plotted against the frequency shift of the received signal referred to the transmit frequency, the power peaks of the spectrum in this way directly give information about the distance to the reflecting transponder device.

In accordance with one embodiment of the invention, a first coded identification is modulated upon the second sequence by means of the transponder device, with the first radio-determined identification being determined from the first coded identification. The transponder device comprises a first coded identification, which is read out by means of the carrier signal or by means of the second sequence of the carrier signal and from which the radio-determined identification is determined. In this process, the first coded identification can be coded by means of Golay Codes on the transponder device. Said codes allow a correlation detection to be used in the control and monitoring device instead of a conventional decoding. By using a correlation detection it is for example possible to differentiate between signals which are received at the same time from two different transponder devices separately from one another even when these have slightly different levels. In this way, an interference with the detection of the radio-determined identification is avoided by another transponder device, which is attached to another technical system in close proximity to the technical system or the influence of the interference is bypassed, with the signals received from the transponder device and the other transponder device being able to be selected separately from one another because of the correlation detection even when the difference in the levels of the two signals is very small.

In accordance with a further embodiment of the invention, the frequency range of the signal modulated by the transponder lies within a predetermined frequency band, with the bandwidth of the frequency range being considerably smaller than the bandwidth of the frequency band which can be used by the control and monitoring device. The control and monitoring devices use carrier signals within a predetermined frequency band. It may now be the case that a first control and monitoring device requests the enabling of operations of automation components of a technical system assigned to it, with at the same time a second control and monitoring device requesting the enabling of the operation of other second automation components assigned to the second control and monitoring device, with the second automation components and the first automation components being located in direct proximity to each other and being able to be used to control different, neighboring units. By limiting the frequency range of the signal modulated by the transponder within a bandwidth, which is considerably smaller than the bandwidth of the frequency band which is used by the first and the second control and monitoring device, it can be ensured that both the control and monitoring devices can determine simultaneously to a greater or lesser degree, the distance or the radio-determined identification concerning corresponding transponder devices by means of sending and receiving the carrier signal, without these control and monitoring devices mutually interfering with one another.

In accordance with a further embodiment of the invention, the first distance is compared to the first distance determined in the previous distance measurement. Operation is only enabled if the amount of the difference between the first distance and the previously determined first distance is less than a predetermined second distance.

In accordance with one embodiment of the invention, additional distances and additional identifications relating to at least one additional transponder device are determined. The at least one additional transponder device is attached to the technical system and has been activated by the automation components after the transmission of the additional identification associated with at least one additional transponder device, with a distance and a radio-determined identification for each of the at least one additional transponder devices being determined, and with the operation of the automation components being enabled when the distance between the control and monitoring device and at least one of the transponder devices is shorter than the predetermined first distance and if the radio-determined identification of the transmitted identification of at least one transponder device corresponds to the corresponding identification transmitted by the automation components. The first distance and the radio-determined identification are determined practically for a first transponder device. In this process, should there be no complications; the enabling follows on the basis of the radio-determined identification and the first distance. However, should it for example be impossible to determine the first distance, the procedure is repeated for an additional second transponder device and an enabling occurs if the distance between the second transponder device and the control and monitoring device is shorter than the predetermined maximum permissible distance and if the radio-determined identification of the second transponder device corresponds to the identification transmitted by the automation components. However, should complications also occur here, for example in the form of the second distance not being able to be determined, the procedure relating to an additional transponder device is repeated until such time as the process is enabled. If only two transponder devices are attached to the technical system, the procedure will now again be repeated in relation to the first transponder device.

In accordance with one embodiment of the invention, the user receives a signal that he is located too far from the automation components, if the first distance is longer than the first predetermined distance.

In another aspect the invention relates to a computer program product with instructions that can be executed on a computer, with the instructions being adapted in such a way as to enable steps of the inventive procedure to be carried out by means of the instructions.

In a further aspect the invention relates to a control and monitoring device for the operation of the automation components of a technical system. The control and monitoring components have means for receipt of a first identification from a first transponder device by the mobile control and monitoring device, with the first transponder device being attached to the technical system, with the first transponder device being able to be activated by the automation components and with the first identification having been transmitted via a wireless communication connection from the automation components to the mobile control and monitoring device. In addition, the control and monitoring device features means for the deactivation of the communication connection between the control and monitoring device and the automation components. In addition, the control and monitoring device features means for transmitting a carrier signal and for (simultaneous) receipt of the carrier signal modulated by the first transponder device. In addition, there are means to determine a first distance between the control and monitoring device and the first transponder device and to determine a first radio-determined identification from the modulated carrier signal. The control and monitoring device also has means to reactivate the communication connection between the control and monitoring device and the automation components and means to enable the operation of the automation components via the mobile control and monitoring device, if the first distance is shorter than a predetermined first distance and if the radio-determined first identification corresponds to the first identification.

In another aspect, the invention relates to a method for enabling the operation of the automation components of a technical system via a mobile control and monitoring device. In accordance with the method, the automation components receive a first message, with the first message having previously been sent by the control and monitoring device, with an inquiry having been made about the operation of the automation components with the first message and with the first message having been transmitted via a wireless communication connection from the control and monitoring device to the automation components. In a further step, a first identification of a first transponder device is transmitted to the control and monitoring device, with the first transponder device being attached to a technical system. The first transponder device is then activated the wireless communication connection deactivated. After the expiry of a predetermined period, the wireless communication connection is then reactivated and the first transponder device is deactivated. For the case in which a enabling signal is received from the control and monitoring device, the operation of the automation components is enabled for the control and monitoring device.

In further aspects the invention relates to an automation component of a technical system and an HMI system with an automation component in accordance with the invention and a control and monitoring system in accordance with the invention.

BRIEF DESCRIPTION OF THE DRAWINGS

The invention is described in more detail below with reference to the exemplary embodiment specified in the figures of the drawing. They are as follows:

FIG. 2 a flow diagram which shows the essential steps of a method in accordance with the invention, FIG. 3 a block diagram of a further HMI system, FIG. 4 a block diagram of a carrier signal, FIG. 5 a further flow diagram of a method in accordance with the invention.

DETAILED DESCRIPTION OF INVENTION

Figure 1:
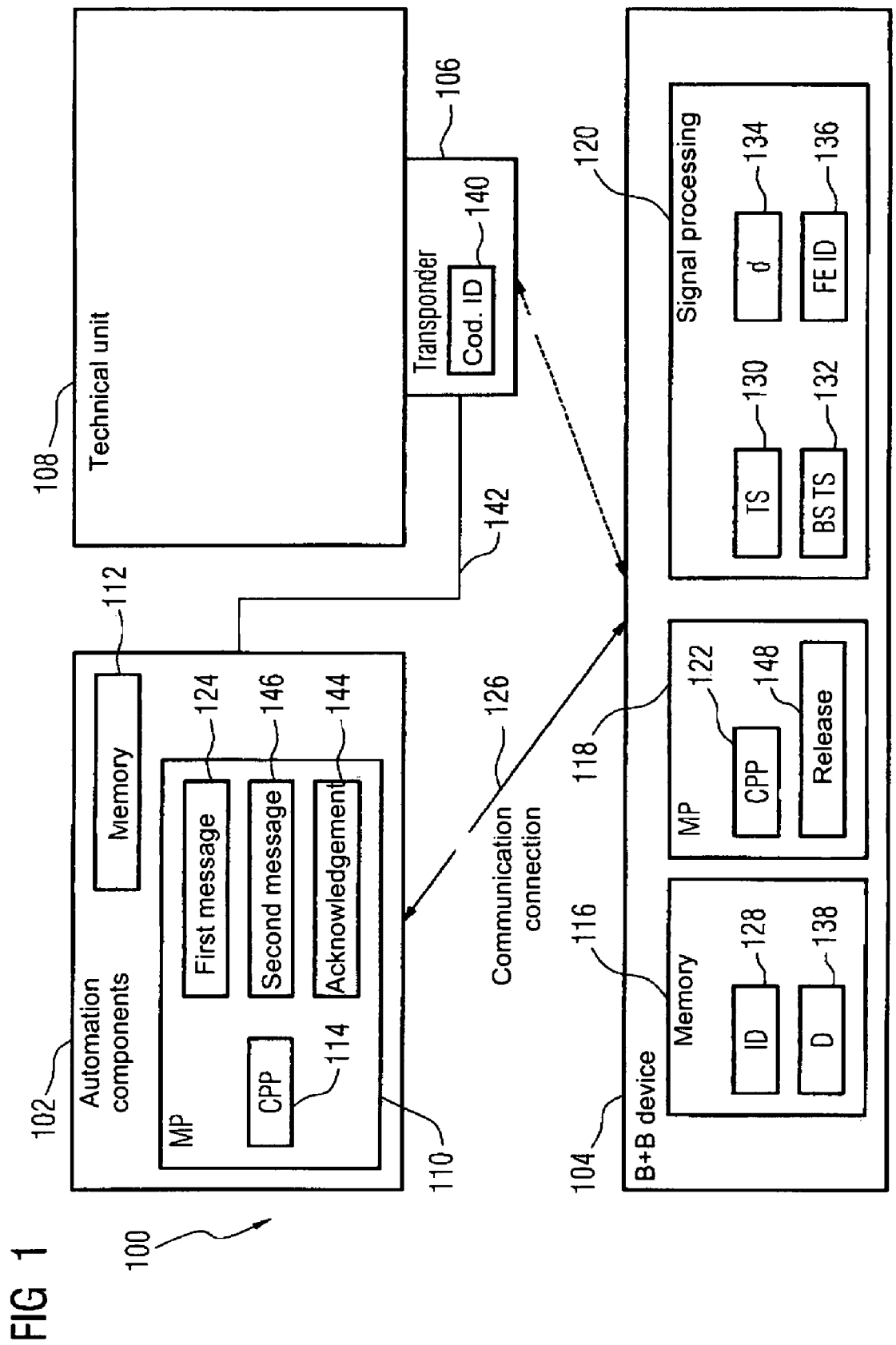
FIG. 1 a block diagram of an HMI system.

FIG. 1 shows a block diagram of an HMI system 100. In this diagram, the HMI system 100 comprises the automation components 102, a control and monitoring device 104 and a transponder device 106. The automation components 102 are provided for the control of a technical system 108. The transponder device 106 is attached to the technical system and can be activated or deactivated via the automation components 102. To this end, the transponder device 106 is connected to the automation components 102 via the connection 142. Connection 142 is for example a twisted pair cable for industrial use through which a supply voltage can be applied to the transponder device 106. The transponder device 106 operates autonomously when the supply voltage is applied.

The mobile control and monitoring device 104 is also provided for the operation and monitoring of the automation components 102 or the control, diagnostic, alarm processing and long-term processes running thereupon.

The automation components 102 comprise a microprocessor 110 and a memory 112. The microprocessor 110 executes a first computer program product 114 which is stored permanently in the memory 112 and is for example loaded into the microprocessor 110 after the automation components 102 have been commissioned.

The control and monitoring device comprises a memory 116, a microprocessor 118 and a signal processing unit 120. The microprocessor 118 executes a second computer program product 122, which is permanently stored on the memory 116 and is for example loaded into the microprocessor 118 when the control and monitoring device 104 is commissioned.

After the control and monitoring device 104 has been activated by a user who wants to carry out a safety-relevant operation of the technical system 108 via the automation components 102, the computer program product 122 generates a first message 124, which is transmitted from the control and monitoring device via a communication connection 126 to the automation components 102. After the reception of the first message 124, the computer program product 114 generates an acknowledgement message 144 which contains an identification 128 assigned to the transponder device 106. The acknowledgement message 144 is transmitted via the communication connection 126 to the control and monitoring device 104. After the identification 128 has been received, the mobile communication device 104 stores the identification 128 in the memory 116, sends a second message 146 to the automation components 102 to acknowledge the reception of the acknowledgement message 144 and then deactivates the communication connection 126. The control and monitoring device generates a carrier signal 130, by means of the signal processing unit 120. The carrier signal 130 is emitted via an antenna (not shown in FIG. 1). The carrier signal 130 is scattered back by the transponder 106 and modulated in this process. From the received scattered back and modulated carrier signal 132, the signal processing unit 120 can determine a first distance 134 between the control and monitoring device 104 and the transponder device 106. In addition, the transponder has modulated a coded identification 140 assigned to it upon the scattered back carrier signal 132. From this coded identification 140, the signal processing unit 120 in addition determines a radio-determined identification 136. In a further step, the control and monitoring device reactivates the communication connection 126 with the automation components 102. For the case that the first distance 134 is shorter than a predetermined first distance 138, which is stored permanently on the control and monitoring device 104 or in the memory 116, and for the case that the radio-determined first identification 136 corresponds to the first identification 128, which has previously been transmitted from the automation components 102 to the control and monitoring device, the operation is enabled by the transmission of an enabling signal 148 vi the communication connection 126. After the reception of the enabling signal 148, the automation components 102 can be operated via the mobile control and monitoring device 104. Otherwise the control and monitoring device 104 blocks the operation of the automation components 102. However, the enabling is only valid while the user of the control and monitoring device carries out the operation requested by means of the first message 124. If the user requests a further operation of the automation components 102, operation has to be enabled again according to the method in accordance with the invention.

FIG. 2 shows a flow diagram which gives a schematic representation of essential steps of the method in accordance with the invention for the enabling of the operation of the automation components of a technical system via a mobile control and monitoring device. In a step 200, the control and monitoring device receives a first identification from a first transponder device, with the first transponder device being attached to the technical system, and with the first transponder device having been activated by the automation components. In this process, the first identification was transmitted via a wireless communication connection from the automation components to the mobile control and monitoring device. In a step 202, a deactivation of communication connection between the control and monitoring device and the automation components takes place. In a step 204, the control and monitoring device sends a carrier signal and in a step 206 the control and monitoring device receives the carrier signal modulated by the first transponder device. In a step 208, a first distance and a first radio-determined identification of the first transponder device is determined from the modulated carrier signal. In this process, the first distance corresponds to the distance between the control and monitoring device and the first transponder device. In a step 210, the control and monitoring device reactivates the communication connection to the automation components. For the case in which the first distance is shorter than a predetermined first distance and if the radio-determined first identification corresponds to the first identification, operation of the automation components is enabled via the mobile control and monitoring device in a step 212. Otherwise the control and monitoring device blocks the operation of the automation components via the control and monitoring device.

FIG. 3 shows a block diagram of a further HMI system 300. In this process, the HMI system 300 comprises automation components 302, a control and monitoring device 304 as well as for instance three transponder devices 306, 308 and 310. The transponder devices 306, 308, 310 are attached to a technical system 312. The automation components 302 serve to control and to monitor the technical system 312. The transponder devices 306, 308, 310 can be activated and deactivated via the automation components 302 (for example by supplying power, which flows from the automation components 302).

The automation components 302 comprise a programmable logic controller 314, which is used for the control of the technical operating resources of the technical systems 312, if required in real time. The automation components 302 are preferably incorporated into a bus system 316, such as for example a Profibus. This system allows a universal networking between a plurality of automation components 302.

The control and monitoring device 304 is used to control and monitor the automation components 302. Said devices can for example be embodied as a wireless handheld terminal and for example have a display and a keypad 318. In addition, provision can be made for an emergency button, an off button, an acknowledgement button and key-operated switches. The mobile control and monitoring device 304 exchanges user data in a contact-free manner via a communication connection 320 with the automation components 302 of the technical system 312. In this way, an operator, using the control and monitoring device 304, can for example view measured values from the technical system 312 on the display of the control and monitoring device 304 or enter control commands via its keypad 318 and send said commands to the automation component 302 where these commands are carried out if the user has previously received an enabling signal for the operation of the automation components 302.

In order to transmit for example measured values and control commands between the mobile control and monitoring device 304 and the automation components 302, the mobile control and monitoring device 304 and the automation components 302 have corresponding data transmission modules 322 and 324. The data is transmitted between the data transmission modules 322 and 324 via the communication connection 320 and is preferably implemented with the aid of radio frequency (RF) signals. In this case, as mentioned above, different data transmission protocols such as for example WLAN or Bluetooth can be used.

The mobile control and monitoring device 304 in addition has a localization module 326, which is embodied for the sending and receiving of radar signals. To this end, the transponder devices 306, 308, 310 are embodied to modulate and to reflect the carrier signals sent by the localization module 326. The carrier signals modulated by and reflected from the transponder devices 306, 308, 310 can then be received by the localization module 326, from which on the one hand, the distance between the control and monitoring device and the corresponding transponder can be determined and, on the other hand, a radio-determined identification for the corresponding transponder can be determined. In this way, the mobile control and monitoring device 304 is in the position to carry out independently a distance determination of the position of at least one of the transponder devices 306, 308, 310. In this case, the transponder devices 306, 308, 310 must not perform any signal evaluation.

However, the transponder devices 306, 308, 310 can only reflect and modulate the carrier signal when these devices have been activated. In order to avoid a distance measurement between the control and monitoring device 304 and one of the transponders 306, 308, 310 by another transponder, the automation components 302 in each case inventively activate only one of the transponder devices 306, 308, 310. For example, the automation components 302 transmit after the reception of a first message by the control and monitoring device, by means of which the operator of the device transmits signals to the automation components 302 that an operation of the automation components 302 is requested, the identification of one of the transponder devices, for example the transponder device 306. Only then is the transponder device 306 activated, while the other two transponder devices 308 and 310 remain deactivated. After the identification of the transponder 306 has been received by the control and monitoring device 304, the communication connection 320 is deactivated. Subsequently the control and monitoring device then determines, as mentioned above, via the localization module 326, the distance to the transponder 306 as well as a radio-determined identification of the transponder 306, which is modulated by the transponder 306 in coded form onto the carrier signal sent by the localization module 326. Only following the determination of the distance to the transponder 306 and after the determination of the radio-determined identification of the transponder 306, will the communication connection 320 be reactivated. If the distance to the transponder 306 is shorter than a predetermined first distance, which corresponds to the maximum permissible distance, and if the radio-determined identification corresponds to the identification which has previously been transmitted by the automation components, the operation of the automation components 302 is enabled via the control and monitoring device.

If the distance measurement or the determination of the radio-determined identification has failed, then subsequently the automation components 302 activate the transponder device 308, and deactivate the transponder device 306. The identification of the transponder device 308 is now, as previously for the transponder device 306, transmitted via the communication connection 320 to the control and monitoring device. After a renewed deactivation of the communication connection 320 the control and monitoring device as described above determines the distance to the transponder 308, as well as the radio-determined identification of the transponder 308. Following that, the communication connection 320 is reactivated. However, if the distance to the transponder 308 is shorter than the predetermined first distance and if the radio-determined identification corresponds to the identification which has previously been transmitted by the automation components, the operation of the automation components 302 is enabled via the control and monitoring device 304.

Otherwise the determination of the distance to the transponder device 310 takes place in the same way as described previously for the transponder devices 306 and 308 as well as the determination of the radio-determined identification of the transponder device 310 by the control and monitoring device. After the control and monitoring device 304 has determined the distance to the transponder device 310, said distance can be compared to the predetermined first distance. If this distance is shorter than the predetermined first distance and if the corresponding radio-determined identification corresponds to the identification, which has previously been transmitted from the automation components to the control and monitoring device, the operation of the automation components 302 is enabled via the mobile control and monitoring device 304 for the operator.

FIG. 4 shows a block diagram of a carrier signal 400. The carrier signal 400 comprises a first sequence 402 and a second sequence 404, with the second sequence 404 being emitted following the first sequence 402. The first sequence 402 is provided in order to determine the distance between the control and monitoring device and the transponder device. The second sequence 404 is provided in order to determine the identification of the transponder device.

In this process, the first sequence 402 is embodied in such a way that, for this reason, the determination of the distance to the transponder device can be determined by means of the frequency modulated continuous wave (FMCW) method according to the prior art. The FMCW method corresponds to a frequency-modulated continuous-dash radar method, with radar beams being emitted continuously and with the frequency of the radar beams being subjected to a periodic modulation. Because the transmit frequency of the carrier signal continuously changes in the first sequence, the emitted radar signal and the radar signal reflecting from the object shows a frequency shift, which corresponds to a runtime difference. This runtime difference reflects double the distance between the control and monitoring device and the reflecting object. In order to determine a distance, the received signals of the first sequence typically have to undergo a spectral analysis. If a power spectrum is plotted against the frequency shift of the received signal referred to the transmit frequency, the power peaks of the spectrum give a direct explanation of the distance to the reflecting transponder. The second sequence 404 is developed in such a way that the transponder device can modulate the coded identification thereupon. The lengths of the first sequence 402 and the second sequence 404 are in addition selected in such a way that the first sequence and the second sequence that were reflected back and received again can be separated from each other.

Alternatively, the possibility would also exist of the distance being determined simultaneously with the identification in the first sequence or in the second sequence. This enables the time needed for the determination to be reduced.

Figure 5:
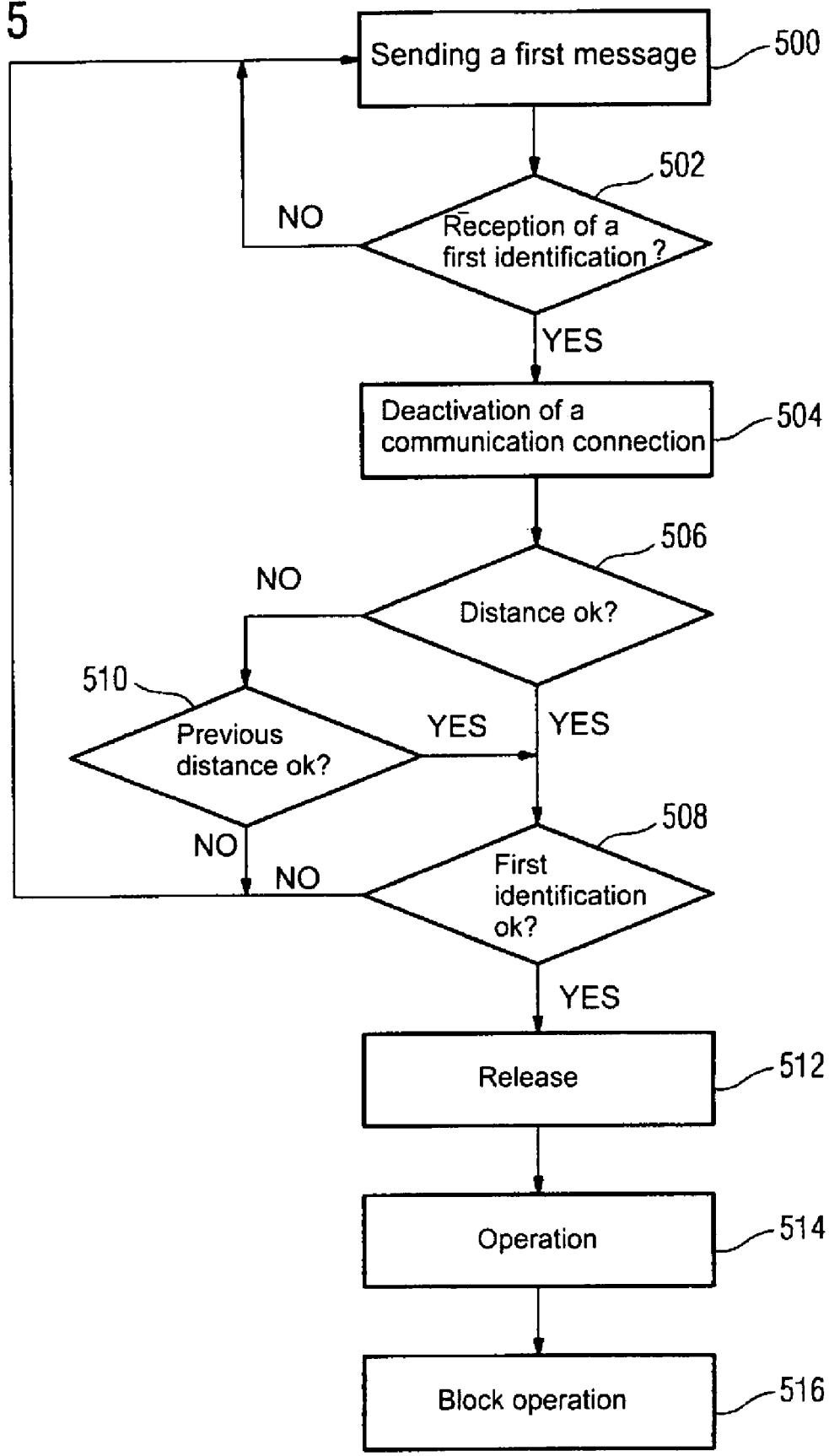

FIG. 5 shows a further flow diagram of a method in accordance with the invention. In a step 500, the control and monitoring device sends a first message to the automation components. If in a step 502, a first identification of a transponder device is received, for example in an acknowledgement message, which has been sent from the automation components to the control and monitoring device, a deactivation of the communication connection via which the first message and the acknowledgement message have been determined takes place in a step 504. If in a step 502, for example after the expiry of a predetermined time span, a first identification has not been received, step 500 is repeated.

In a step 506 it is determined whether or not a first distance between the control and monitoring device and the transponder device that was determined by means of the FMCW method, is shorter than a predetermined distance, so that the control and monitoring device is located inside a predetermined safety area with regard to the transponder device. If the first distance is shorter than the predetermined distance, a check is performed in a step 508, to determine whether or not a radio-determined identification, which has been modulated by the transponder device in coded form into a carrier signal, corresponds to the first identification. If this is the case, the enabling of the operation of the automation components for the user of the control and monitoring devices takes place in a step 512. In a step 514, the operation of the automation components by the user takes place. After successful operation, the operation of the control and monitoring device is then again disabled for the user in a step 516.

If, in a step 506, the first distance cannot for example be compared to the predetermined distance because the distance measurement for determining the first distance produced no results, then in a step 510, the first distance, which has been determined from a previous measurement (or for example the average value of a plurality of previous measurements) is compared to the previous distance. If the first distance from the previous distance measurement is shorter than the predetermined distance, then step 508 is carried out following that, otherwise the procedure starts anew with step 500.

The invention claimed is:

1. A method for enabling an operation of automation components of a technical system via a mobile control and monitoring device, comprising:

activating a first transponder device by at least one automation component, wherein the first transponder device is attached to the technical system;
receiving a first identification from the first transponder device by the mobile control and monitoring device transmitted via a wireless communication connection;
deactivating the communication connection between the mobile control and monitoring device and the automation components;
while the communication connection is deactivated,
sending a carrier signal by the mobile control and monitoring device;
modulating the carrier signal by the first transponder device;
receiving the modulated carrier signal by the mobile control and monitoring device;
determining a first distance between the mobile control and monitoring device and the first transponder device;
determining a radio-determined identification of the first transponder device based upon the modulated carrier signal;
reactivating the communication connection between the mobile control and monitoring device and the automation components; and
enabling an operation of the automation components via the mobile control and monitoring device, if the first distance is shorter than a predetermined first distance and if the radio-determined identification corresponds to the first identification.

2. The method as claimed in claim 1, further comprising:
transmitting a first message to the automation components after activation of the mobile control and monitoring device by the user, wherein a user requests operating the automation components via the first message,
receiving an acknowledgement message from the automation components by the mobile control and monitoring device, wherein the first identification is transmitted in the acknowledgement message or in a further message following the acknowledgement message, and
sending a second message from the mobile control and monitoring device to the automation components to confirm receipt of the acknowledgement message.

3. The method as claimed in claim 2, wherein the first transponder device is activated by the automation components after receiving the second message.

4. The method as claimed in claim 1, wherein the carrier signal comprises a first sequence, wherein the first sequence is used to determine a first distance, and wherein the first sequence is used to determine the radio-determined identification.

5. The method as claimed in claim 1, wherein the carrier signal has a first sequence and a second sequence, wherein the first sequence is used for determining the first distance, and wherein the second sequence is used for determining the radio-determined identification.

6. The method as claimed in claim 5, wherein the first distances is determined based upon the first sequence and based upon a frequency modulated continuous wave method.

7. The method as claimed in claim 5, wherein a first coded identification is modulated on the second sequence by the transponder device, and wherein the radio-determined identification is determined based upon the first coded identification.

8. The method as claimed in claim 7, wherein the first radio-determined identification is determined based upon the first coded identification based upon a correlation detection, wherein the first coded identification is coded based upon Golay Codes on the transponder device.

9. The method as claimed in claim 1, wherein a frequency range of the carrier signals lies within a predetermined frequency band, wherein a bandwidth of the signal modulated by the first transponder is smaller than a bandwidth of the frequency band.

10. The method as claimed in claim 9, wherein the frequency range for each carrier signal to be sent is randomly selected from the frequency band.

11. The method as claimed in claim 1, wherein determined first distances are stored on the mobile control and monitoring device, and wherein a stored distance that was determined last is compared to the predetermined first distance, if a recent first distance cannot be determined.

12. The method as claimed in claim 1, comprising:
receiving a second identification from a second transponder device by the mobile control and monitoring device transmitted via a wireless communication connection,
activating the second transponder device by at least one automation component after receiving the second identification, wherein the second transponder device is attached to the technical system,
deactivating the communication connection between the mobile control and monitoring device and the automation components,
while the communication connection is deactivated,
sending a carrier signal by the mobile control and monitoring device,
modulating the carrier signal by the second transponder device,
receiving the modulated carrier signal by the mobile control and monitoring device,
determining a second distance between the mobile control and monitoring device and the second transponder device,
determining a further radio-determined identification of the second transponder device based upon the modulated carrier signal, and
reactivating the communication connection between the mobile control and monitoring device and the automation components,
determining a distance and a radio-determined identification for each of the at least one additional transponder devices, and
enabling the operation of the automation components when:
the distance between the mobile control and monitoring device and at least one of the transponder devices is shorter than the predetermined first distance, and
if the radio-determined identification of the transmitted identification of one of the transponder devices corresponds to the corresponding identification transmitted by the transponder device.

13. A control and monitoring device to operate automation components of a technical system, comprising:
a receiver to receive a first identification of a first transponder device by the control and monitoring device, wherein the first transponder device is attached to the technical system, wherein the first transponder device is activated by the automation components, and wherein the first identification is transmitted via a wireless communication connection from the automation components to the control and monitoring device;
a deactivator to deactivate the communication connection between the control and monitoring device and the automation components;

a transmitter to send a carrier signal while the communication connection is deactivated;

a receiver to receive the carrier signal modulated by the first transponder device while the communication connection is deactivated;

a determining device to determine a first distance to the first transponder device and a first radio-determined identification of the first transponder device from the modulated carrier signal;

a reactivating device to reactivate the communication connection between the control and monitoring device and the automation components; and an enabling device to enable the operation of the automation components via the control and monitoring device if the first distance is shorter than a predetermined first distance and if the radio-determined first identification corresponds to the first identification.

14. The control and monitoring device as claimed in claim 13, wherein the control and monitoring device is mobile.

15. The control and monitoring device as claimed in claim 14, further comprising:

a transmitter to transmit a first message to the automation components after the mobile control and monitoring device has been activated by a user, with the user requesting, by means of the first message, information about the operation of the automation components;

a receiver to receive an acknowledgement message from the automation components, with the first identification being transmitted in the first acknowledgement message or in a further message following the acknowledgement message;

a transmitter to send a second message to the automation components to confirm receipt of the acknowledgement message, wherein the first transponder device is activated after receiving the second message from the automation components.

16. The control and monitoring device as claimed in claim 14, further comprising a generator to generate the carrier signal comprising a first sequence and a second sequence, wherein based upon the first sequence the first distance is determined, and wherein based upon the second sequence the first radio-determined identification is determined.

17. The control and monitoring device as claimed in claim 16, wherein a first coded identification is modulated based upon the second sequence by the transponder device, and wherein the control and monitoring device decodes the first coded identification.

18. The control and monitoring device as claimed in claim 17, wherein the first coded identification is coded based upon Golay Codes on the transponder device, wherein the control and monitoring device has a correlation detection, wherein the first radio-determined identification is determined from the first coded identification based on the correlation detection.

19. The control and monitoring device as claimed in claim 14, wherein the carrier signal is generated within a predetermined frequency range, and wherein the bandwidth of the signal modulated by the first transponder is smaller than the bandwidth of the frequency band.

20. A method to enable an operation of automation components of a technical system via a mobile control and monitoring device, comprising:

receiving a first message from the control and monitoring device to request an operation of the automation components, wherein the first message is transmitted via a wireless communication connection from the control and monitoring device to the automation components;

transmitting a first identification from a first transponder device to the control and monitoring device, wherein the first transponder device is attached to the technical system;

activating the first transponder device;

deactivating the wireless communication connection;

reactivating the wireless communication connection after an expiry of a predetermined time and deactivation of the first transponder device; and enabling of the operation of the automation components if an enabling signal is received by the control and monitoring device.

* * * * *